United States Patent [19]

Bennett

[11] 3,710,645

[45] Jan. 16, 1973

[54] REMOTE CONTROL ASSEMBLY
[75] Inventor: William G. Bennett, Troy, Mich.
[73] Assignee: Teleflex, Inc., North Wales, Pa.
[22] Filed: Oct. 8, 1970
[21] Appl. No.: 79,008

[52] U.S. Cl. .............................74/501 P, 287/58 CT
[51] Int. Cl. .................................................F16c 1/10
[58] Field of Search .........74/501, 501 P, 502; 64/14;
   285/302, 303, 298; 236/51; 73/321, 318;
   287/58 CT

[56] References Cited

UNITED STATES PATENTS

| 2,719,693 | 10/1955 | Penberthy | 287/58 CT |
| 3,587,341 | 6/1971 | Fiddler | 74/501 |
| 3,572,159 | 3/1971 | Tschanz | 74/501 |
| 930,406 | 8/1909 | McDonald | 285/302 X |

Primary Examiner—William E. Wayner
Attorney—McGlynn, Reising, Milton & Ethington

[57] ABSTRACT

A flexible motion transmitting remote control assembly including a conduit and a motion transmitting core element movably supported by the conduit with the ends thereof extending from the ends of the conduit. An adjustment means disposed adjacent one end of the conduit for allowing the conduit to move longitudinally relative thereto to adjust the distance the core element extends from the conduit. The adjustment means includes a support member adapted for attachment to support structure and having a bore therein in which is disposed a fitting secured to the conduit. A latch is movably supported by the support member and is biased into locking engagement with the fitting on the conduit by a straight metal wire spring.

9 Claims, 4 Drawing Figures

PATENTED JAN 16 1973
3,710,645
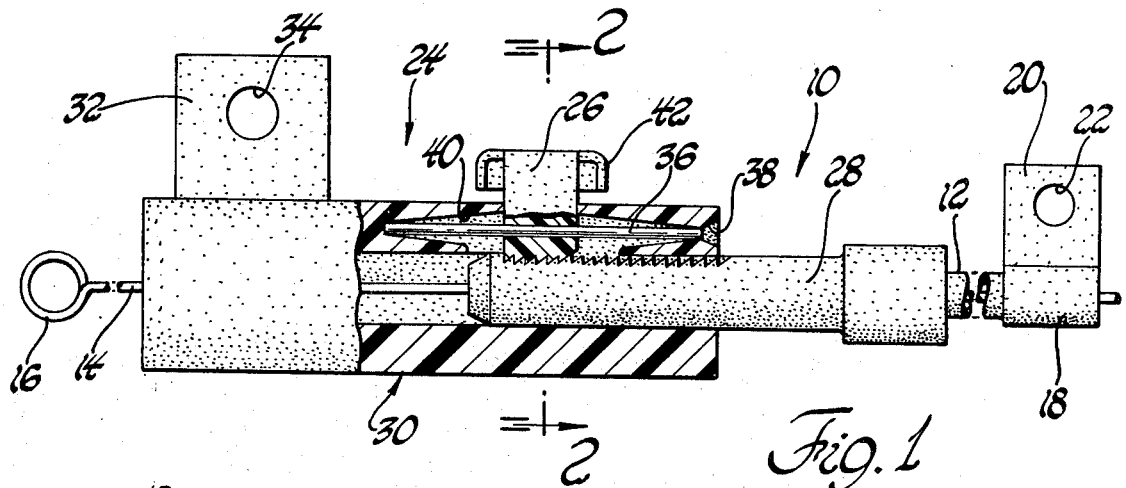
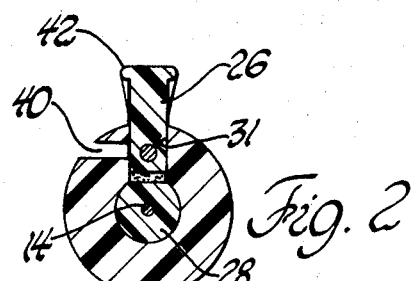
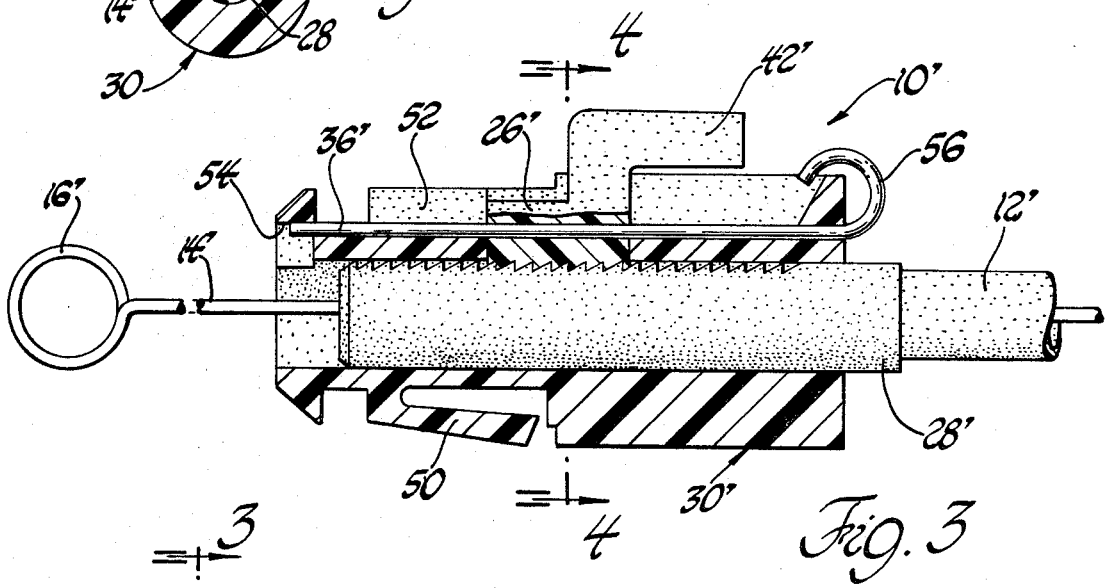
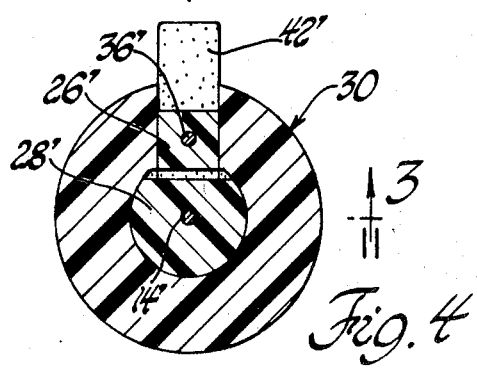
INVENTOR.
William G. Bennett
BY
Barnard, McGlynn & Reising
ATTORNEYS

REMOTE CONTROL ASSEMBLY

The instant invention relates to a motion transmitting remote control assembly of a type wherein motion is transmitted in a curved path by a flexible motion transmitting core element movably supported by a flexible conduit.

Such remote control assemblies are normally attached to support with the core element extending from each end of the assembly. It is frequently desirable to adjust the length of the conduit to change the distance the core element extends from the end of the conduit once the assembly is installed.

A recent invention allows one individual to make this adjustment once the remote control assembly is installed by merely applying a predetermined force to the motion transmitting core element. In such an assembly, the conduit has a fitting on one end thereof with ratchet teeth on the fitting and the fitting extends into a bore in a support member which is attached to support structure. The support member has fingers integral therewith with teeth which are biased into engagement with the ratchet teeth on the fitting secured to the conduit. Once this assembly is installed, a tension load upon the conduit will tend to remove curves or bends from the conduit and thereby force the fitting secured to the conduit further into the bore of the support member, thus allowing the core element to extend farther from the assembly. Such an assembly is disclosed in copending application Ser. No. 79,195 filed Oct. 8, 1970 in the name of William G. Bennett and Donald M. Miller and assigned to the Assignee of the instant invention, now U.S. Pat. No. 3,662,617. The problem associated with that assembly is that once the assembly is adjusted, it is very difficult, if not impossible, to release the locking fingers from locking engagement with the ratchet teeth on the fitting secured to the conduit to reposition or readjust the assembly as for repair and maintenance purposes. Another disadvantage of the previous assembly is that the degree or amount of force with which the ratcheting teeth are urged together is not easily controlled and it is difficult to vary among identical configurations having different requirements.

Accordingly, it is an object and feature of this invention to provide a motion transmitting remote control assembly including adjustment means for allowing the conduit to move longitudinally relative thereto to adjust the distance the core element extends from the conduit and including locking means engageable with the conduit for controlling the longitudinal movement thereof and independent biasing means for urging the locking means into engagement with the conduit whereby different biasing means may be used for different environments and whereby the locking means may be easily manually released.

In correlation with the foregoing object and feature, it is another object and feature of this invention to provide such a remote control assembly wherein the adjustment means includes a support member and the conduit has a fitting on the end thereof disposed in a bore in the support member and the locking means comprises a latch engageable with the fitting secured to the conduit and a spring member reacting between the support body and the latch to urge the latch into locking engagement with the fitting secured to the conduit.

Other objects and attendant advantages of the present invention will be readily appreciated as the same becomes better understood by reference to the following detailed description when considered in connection with the accompanying drawings wherein:

FIG. 1 is an elevational view partially broken away and in cross section of a preferred embodiment of the instant invention;

FIG. 2 is a cross sectional view taken substantially along line 2—2 of FIG. 1;

FIG. 3 is a cross sectional view of another preferred embodiment but with the cross sectional view being at right angles and taken along lines 3—3 of FIG. 4; and FIG. 4 is a cross sectional view taken substantially along lines 4—4 of FIG. 3.

Referring now to the drawings, preferred embodiments of a motion transmitting remote control assembly constructed in accordance with the instant invention are respectively shown at 10 and 10'.

Turning to the embodiment of FIGS. 1 and 2, the assembly 10 includes a conduit 12 which has an outer surface of organic polymeric material such as polyethylene or the like. Preferably, the conduit 12 is of the well-known type utilized in each remote control assemblies including an inner cubular member of organic polymeric or plastics material surrounded by a plurality of filaments or metal wires disposed on a long lead and encased in an outer jacket of organic polymeric material such as polyethylene or an equivalent plastic material.

The assembly 10 also includes a metal flexible wirelike motion transmitting core element 14 movably supported by the conduit 12. The ends of the core element 14 extend from the ends of the conduit 12. Both ends of the core element 14 may be adapted for attachment to control members, as by loops 16. In many embodiments, one end of the core element will be attached to a member to be controlled whereas the other end of the core element will be attached to a manually actuatable control knob, or the like.

A fitting 18, preferably of organic polymeric material, is disposed about or adjacent a first end of the conduit 12 for attaching the conduit 12 to support structure, such as the body of an automobile. The fitting 18 has a flange 20 extending therefrom with a hole 22 therein through which an appropriate fastening means may be disposed.

An adjustment means generally indicated at 24 is included for allowing the conduit 12 to move longitudinally relative thereto to adjust the distance the core element extends from the conduit.

The adjustment means 24 includes locking means comprising the latch 26 which is engageable with the conduit for controlling the longitudinal movement thereof. More specifically, another fitting 28 is secured to and forms a part of the conduit 12 and is engaged by the latch 26.

The adjustment means 24 also includes a support member generally indicated at 30. The support member 30 has a bore extending thereinto and the fitting 28 is disposed in the bore. The support member 30 includes a passageway 31 which extends transversely to the bore of the support member 30 and the latch 26 is movably disposed in the passageway 31 for engaging the fitting 28. The support member 30 is adapted for attachment to support structure by a flange 32 having a hole 34 therein.

The assembly 24 also includes biasing means comprising the spring member 36 for urging the latch 26 into engagement with the fitting 28. The spring member 36 is supported by the support member 30 and reacts between the support member 30 and the latch 26. Preferably, the spring member 36 comprises a metal wire.

The support member 30 has a cavity 40 extending thereinto from the side and an opening 38 into which the spring member 36 may be inserted. The cavity 40 opens to the side of the support member 30, as shown in FIG. 2, to facilitate the forming of the cavity in which the spring member 36 is disposed during injection molding of the support member 30. The cavity 40 is tapered outwardly from the ends thereof to allow movement or flexing of the spring member 36. The spring member 36 is straight or includes a generally straight portion which is retained in the cavity 40 of the support member and passes through a passage in the latch 26.

The latch 26 includes a manually graspable portion 42 which extends from the support member 30 so as to be accessible for disengaging the latch member 26 from the fitting 28.

The latch 26 and the fitting 28 include a plurality of coacting irregularities comprising ratcheting teeth which are biased into locking engagement with each other by the spring member 36 for controlling relative movement between the support member 30 and the conduit 12.

The ratcheting teeth are inclined in one direction and have walls which extend generally transversely to the axis of the core element 14 for allowing movement of the fitting 28 relative to the support member 30 in one direction while normally preventing such movement in the opposite direction.

Preferably, the fittings 18 and 28 as well as the support member 30 and the latch 26 are made of organic polymeric material such as polyethylene or another appropriate plastic.

Turning now to the embodiment of FIGS. 3 and 4, it employs the same basic components and structure as the first embodiment, all of which are indicated with like numbers but with a prime designation. The embodiment of FIGS. 3 and 4 differs from the first described embodiment by utilizing a different means for attaching the support member 30' to support structure. The embodiment of FIG. 3 includes snap-in fingers 50, only one of which is shown. There is a snap-in finger 50 on each side of the support member 30' so that the support member 30' may be snapped into an aperture in a bulkhead or the like.

Additionally, the support body 30' has a groove 52 therein in which the spring member 36' is disposed. One end of the spring member 36' is disposed in an opening 54 in the forward end of the support member 30'. The other end of the spring member 36' has a locking bend 56 therein to retain the spring member 36' secured to the support member 30'.

Additionally, the latch 26' has a different configuration and includes the manually graspable portion 42'.

In all other respects, the embodiment of FIGS. 3 and 4 is structurally alike and functions the same as the embodiment of FIGS. 1 and 2.

In operation, the remote control assembly may be installed by attaching the support member 30 or 30' to support structure while attaching the fitting 18 at the other end of the conduit to support structure. The loop 16 or 16' of the core element 14 or 14' is connected to a member to be controlled. The fitting 28 or 28' is disposed within the bore of the support member 30 or 30' only a slight distance so that the conduit extends over a curved path between its ends and which curved path is too long. In this situation, the length of the conduit is adjusted by pulling the core element 14 or 14' from the right as viewed in FIGS. 1 and 3 until the member to which the loop 16 or 16' is attached has moved to its maximum or extreme position to the right, i.e., has bottomed out. Once bottomed out, the loop 16 or 16' can move no further to the right and a continued force applied to the core element 14 or 14' will place a force upon the conduit tending to decrease its length by removing any curves, bends or bows in its path. In other words, such a tension force on the core will tend to straighten out the conduit. When this force reaches a predetermined level, the conduit will shorten as the fitting 28 or 28' moves or ratchets into the support member 30 or 30'; thus, automatically adjusting the length of the conduit.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, the invention may be practiced otherwise than as specifically described.

The embodiments of the invention in which an exclusive property or privilege is claimed are defined as follows:

1. A motion transmitting remote control assembly of the type for transmitting forces along a curved path by a motion transmitting core element, said assembly comprising a flexible conduit, a flexible motion transmitting core element movably supported by said conduit with the ends thereof extending from the ends of said conduit, a support member, locking means engageable with said conduit for controlling the longitudinal movement thereof relative to said support member, and independent biasing means reacting between said support member and said locking means for urging said locking means into engagement with said conduit whereby the distance said core element extends from said conduit may be adjusted, said conduit and said locking means including coacting irregularities biased into engagement with each other by said biasing means for controlling relative movement between said support member and said conduit, said coacting irregularities comprising ratcheting teeth for allowing relative movement between said conduit and said support member in one direction while normally preventing such movement in the opposite direction.

2. An assembly as set forth in claim 1 wherein said biasing means includes a flexible spring member.

3. An assembly as set forth in claim 2 wherein said spring member is made of metal.

4. An assembly as set forth in claim 3 wherein said support member is adapted for attachment to a support structure.

5. An assembly as set forth in claim 4 wherein said locking means includes a latch having a manually graspable portion extending from said member.

6. An assembly as set forth in claim 5 wherein said metal spring member has a straight portion retained by said support member and extending through said latch.

7. An assembly as set forth in claim 6 wherein said conduit includes a fitting secured to one end thereof, said support member has a bore extending thereinto in which said fitting is disposed, said support member having a passageway extending transversly to said bore, said latch being movably disposed in said passageway for engaging said fitting in said bore.

8. An assembly as set forth in claim 1 wherein said biasing means is made of metal.

9. An assembly as set forth in claim 1 wherein said locking means includes a latch having a manually graspable portion extending from said support member.

* * * * *